US010180078B2

(12) United States Patent
Roach et al.

(10) Patent No.: US 10,180,078 B2
(45) Date of Patent: Jan. 15, 2019

(54) SHAFT SHEAR DETECTION IN GAS TURBINE ENGINES

(71) Applicant: PRATT & WHITNEY CANADA CORP., Longueuil (CA)

(72) Inventors: Andrew Elliot Roach, Brampton (CA); Zubair Ahmad, Etobicoke (CA); Ryan John Perera, Etobicoke (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 42 days.

(21) Appl. No.: 15/361,130

(22) Filed: Nov. 25, 2016

(65) Prior Publication Data

US 2018/0045071 A1    Feb. 15, 2018

Related U.S. Application Data

(60) Provisional application No. 62/351,756, filed on Jun. 17, 2016.

(51) Int. Cl.
| | |
|---|---|
| *G05D 1/00* | (2006.01) |
| *F01D 21/00* | (2006.01) |
| *B64D 27/10* | (2006.01) |
| *B64D 45/00* | (2006.01) |
| *F01D 5/02* | (2006.01) |
| *F02C 9/46* | (2006.01) |
| *G01L 5/00* | (2006.01) |
| *F01D 21/06* | (2006.01) |
| *F02C 3/10* | (2006.01) |

(52) U.S. Cl.
CPC ........... *F01D 21/003* (2013.01); *B64D 27/10* (2013.01); *B64D 45/00* (2013.01); *F01D 5/02* (2013.01); *F01D 21/06* (2013.01); *F02C 9/46* (2013.01); *G01L 5/00* (2013.01); *F02C 3/10* (2013.01); *F05D 2220/32* (2013.01); *F05D 2240/60* (2013.01)

(58) Field of Classification Search
None
See application file for complete search history.

(56) References Cited

U.S. PATENT DOCUMENTS

| 5,234,315 A | 8/1993 | Ogihara et al. |
| 5,293,774 A | 3/1994 | Ratherham |
| (Continued) | | |

FOREIGN PATENT DOCUMENTS

| EP | 2588718 B1 | 11/2017 |
| FR | 2921974 | 4/2009 |

*Primary Examiner* — Bhavesh V Amin
(74) *Attorney, Agent, or Firm* — Norton Rose Fulbright Canada LLP (57) ABSTRACT

There is described herein methods and systems for detecting a shaft event, such as a shaft shear, a shaft decoupling, and/or a shaft failure in a gas turbine engine. The method comprises determining a detection threshold as a set of threshold values for a spool speed of a first spool of the engine and a load transfer through a shaft of a second spool of the engine different from the first spool, the set of threshold values varying throughout a flight envelope, the detection threshold defining, for each spool speed value, at least one load transfer value beyond which a shaft event is detected. Operation values of the spool speed and the load transfer are obtained during operation of the engine, and the operation values are compared to the detection threshold. The shaft event is detected when the operation values are below the detection threshold.

13 Claims, 6 Drawing Sheets

(56) References Cited

U.S. PATENT DOCUMENTS

| | | |
|---|---|---|
| 5,363,317 A | 11/1994 | Rice et al. |
| 6,293,085 B2 | 9/2001 | Thompson et al. |
| 6,494,046 B1 | 12/2002 | Hayess |
| 8,172,509 B2 | 5/2012 | Bart et al. |
| 8,943,876 B2 | 2/2015 | Rowe et al. |
| 2012/0210694 A1 | 8/2012 | Holmquist |
| 2013/0098042 A1 | 4/2013 | Frealle et al. |
| 2013/0133333 A1 | 5/2013 | Bacic |
| 2013/0152600 A1 | 6/2013 | Rowe |

SHAFT SHEAR DETECTION IN GAS TURBINE ENGINES

CROSS-REFERENCE TO RELATED APPLICATIONS

This application claims the benefit of U.S. Provisional Patent Application No. 62/351,756 filed on Jun. 17, 2016, the contents of which are hereby incorporated by reference in their entirety.

TECHNICAL FIELD

The disclosure relates generally to detecting shaft shears and, more particularly, to detecting shaft shears of loaded, rotating shafts in gas turbine engines.

BACKGROUND OF THE ART

The low pressure shaft on a gas turbine engine connects the lower pressure turbine to the propeller, and transfers the power from the turbine to the propeller. The transferred power is then converted into engine thrust. During engine operation, the shaft experiences very high torsional loads. In the unlikely event of a shaft shear and loss of load, the fuel must be shut off quickly to prevent damage to the engine.

Several methods exist for detecting shaft shear. For example, mechanical axial detection involves using a probe or sensor adjacent to a rear end of the shaft to detect the axial motion of the shaft after the shear. The sheared shaft collides with the sensor, resulting in a fuel shutoff. Another example comprises using a processor to calculate a rate of change of shaft speed. When the rate of change falls below a certain value for a period of time, a fuel shutoff is commanded.

Methods that involve delayed indicators, such as axial displacement and axial movement, or time-consuming signal processing, such as rate of change of shaft speed, are not well-suited for a process requiring rapid fuel shutoff. In addition, methods that require special sensors or additional hardware also have certain disadvantages, such as additional cost and weight, and/or give rise to durability and reliability concerns.

There is therefore a need to improve on existing methods for detecting shaft shear.

SUMMARY

In one aspect, there is provided a method for detecting a shaft event in a gas turbine engine shaft. The method comprises determining a detection threshold as a set of threshold values for a spool speed of a first spool of the engine and a load transfer through a shaft of a second spool of the engine different from the first spool, the set of threshold values varying throughout a flight envelope, the detection threshold defining, for each spool speed value, at least one load transfer value beyond which a shaft event is detected. Operation values of the spool speed and the load transfer are obtained during operation of the engine, and the operation values are compared to the detection threshold. The shaft event is detected when the operation values are below the detection threshold.

In another aspect, there is provided a system for detecting a shaft event in a gas turbine engine. The system comprises a processing unit and a non-transitory memory communicatively coupled to the processing unit. The memory has stored computer-readable program instructions executable by the processing unit for determining a detection threshold as a set of threshold values for a spool speed of a first spool of the engine and a load transfer through a shaft of a second spool of the engine different from the first spool, the set of threshold values varying throughout a flight envelope, the detection threshold defining, for each spool speed value, at least one load transfer value beyond which a shaft event is detected. The program instructions are further executable for obtaining operation values of the spool speed and the load transfer during operation of the engine, comparing the operation values to the detection threshold, and detecting the shaft event when the operation values are below the detection threshold.

In yet another aspect, there is provided a non-transitory computer readable medium having stored thereon program code executable by a processor for detecting a shaft event in a gas turbine engine. The program code comprises instructions for determining a detection threshold as a set of threshold values for a spool speed of a first spool of the engine and a load transfer through a shaft of a second spool of the engine different from the first spool, the set of threshold values varying throughout a flight envelope, the detection threshold defining, for each spool speed value, at least one load transfer value beyond which a shaft event is detected; obtaining operation values of the spool speed and the load transfer during operation of the engine; comparing the operation values to the detection threshold; and detecting the shaft event when the operation values are below the detection threshold.

DESCRIPTION OF THE DRAWINGS

Reference is now made to the accompanying figures in which.

DETAILED DESCRIPTION

There is described herein methods and systems for detecting a shaft event, such as a shaft shear, a shaft decoupling, and/or a shaft failure in a gas turbine engine, using a relationship between a speed of a first spool of the engine and a load transfer through a shaft of a second spool of the engine. This relationship is used to determine a detection threshold for the shaft event.

Figure 1:
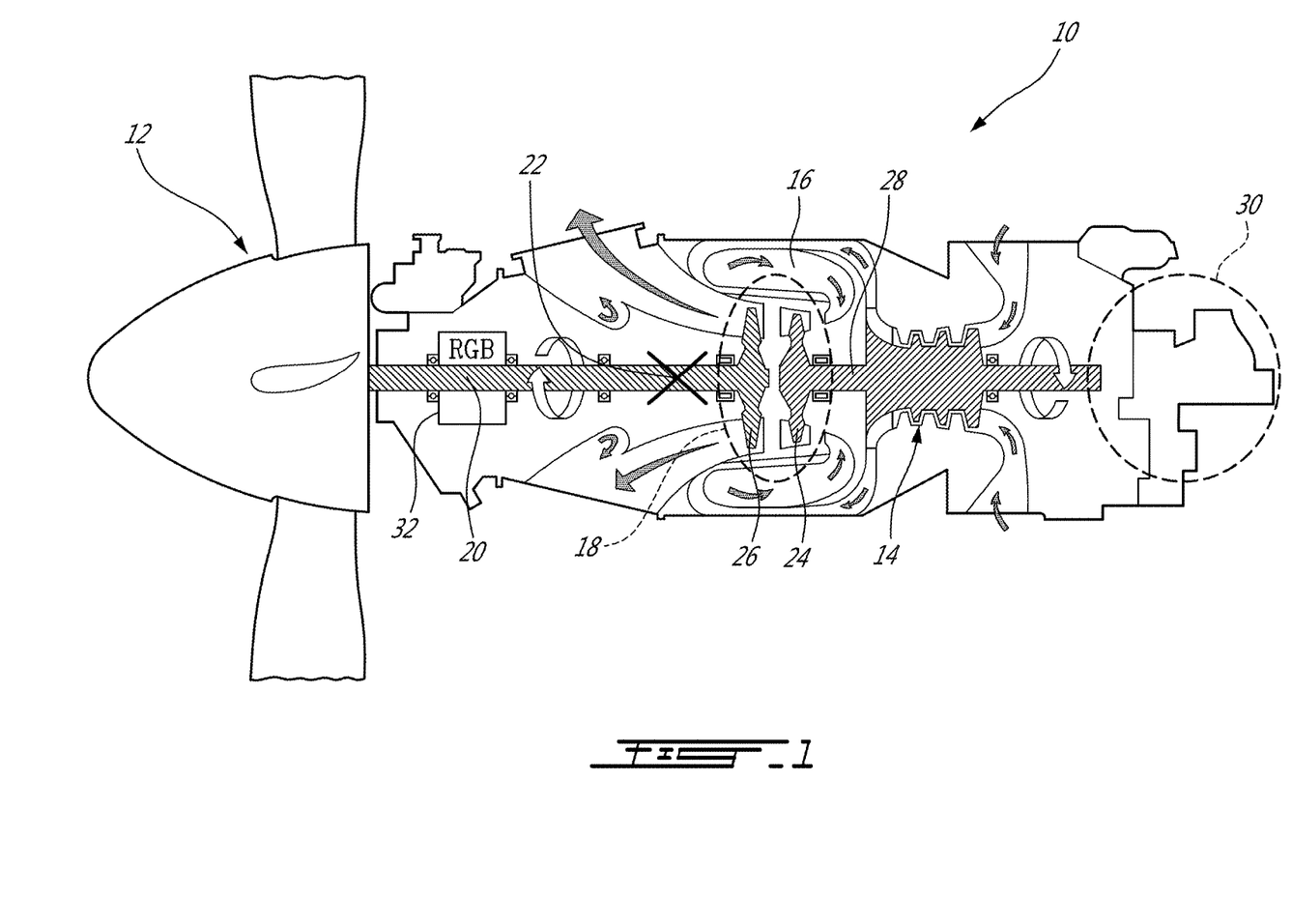
FIG. 1 is a schematic cross-sectional view of a gas turbine engine.

FIG. 1 illustrates a gas turbine engine 10 for which a shaft event, such as a shaft shear, a shaft decoupling, or any other type of shaft failure, may be detected using the systems and methods described herein. Note that while engine 10 is a turboprop engine, the detection methods and systems described herein may also be applicable to turbofan engines and turboshaft engines. The detection methods and systems are applicable to engines having two or more spools.

Engine 10 generally comprises in serial flow communication a propeller 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A low pressure spool is composed of a low pressure shaft 20 and a low pressure turbine 26. The low pressure shaft drives the propeller 12. A high pressure spool is composed of a high pressure turbine 24 attached to a high-pressure shaft 28, which is connected to the compressor section 14. A shaft event may occur and be detected at any point 22 along the low pressure shaft 20. In an engine configuration having three spools, namely a low pressure spool, a high pressure spool, and a power turbine spool, a shaft event may occur and be detected at any point along a low pressure shaft of the low pressure spool or a power turbine shaft of the power turbine spool.

The shaft event is detected using a relationship established between the speed of a first spool in the engine 10, such as the high pressure spool or the low pressure spool, and a load transfer through the shaft of a second spool different from the first spool, i.e. the low pressure spool if the high pressure spool speed is used, and the power turbine spool if the low pressure spool speed is used. In other words, if the shaft event is to be detected on a shaft of a low pressure spool, then the speed of the high pressure spool and the load transfer through the low pressure shaft are used. If the shaft event is to be detected on a shaft of a power turbine, then the speed of the high pressure spool or the speed of the low pressure spool is used, and the load transfer through the power turbine shaft is used.

Figure 2A:
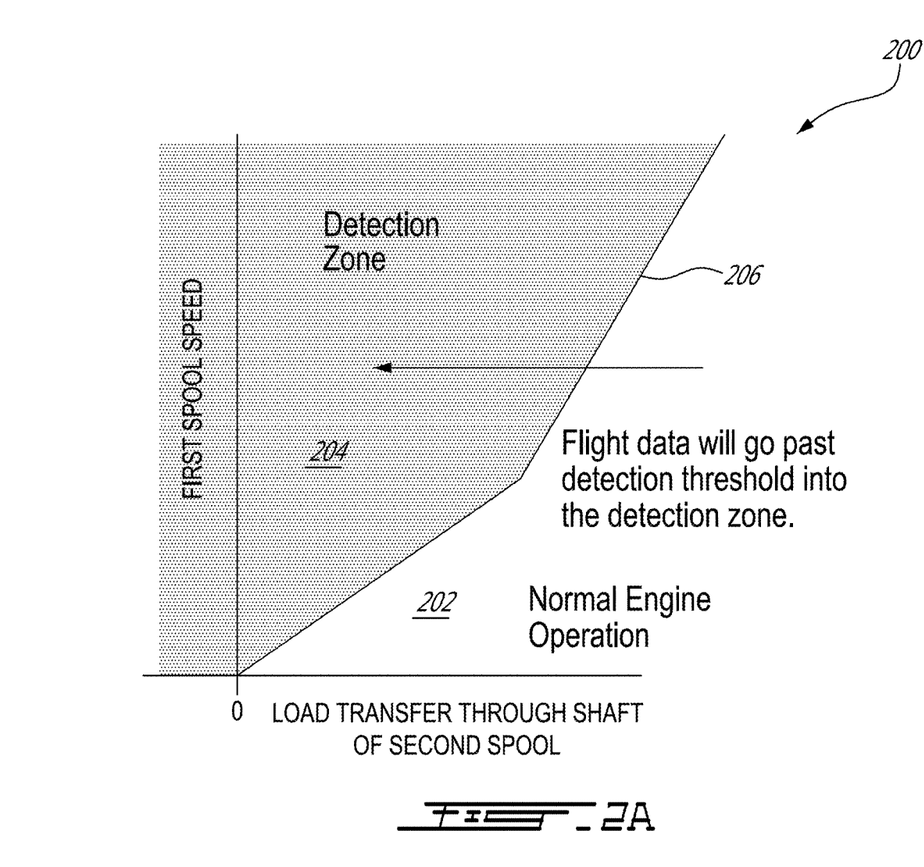
FIG. 2A is graphical illustration of the relationship between the spool speed of a first spool of the engine and the load transfer through the shaft of a second spool of the engine.

This relationship is illustrated graphically in FIG. 2A, through graph 200. The y-axis of graph 200 represents the speed of a first spool, such as the high pressure spool, which may be obtained by measuring the speed of the high pressure shaft 28 or the speed of the high pressure turbine 24. The first spool speed can also be a low pressure spool speed. A sensor may be placed anywhere in the engine 10 so as to measure the speed of the high pressure spool. In some embodiments, the sensor is located in the back end 30 of the engine 10 for measurement of the high pressure spool speed. For example, an accessory gear box (AGB) may be found in the back end 30 of the engine 10 and a speed sensor may be placed in the AGB. In this manner, the sensor is located in an environment that is cooler and less harsh than the immediate area of the turbine section 18. Any type of speed sensor may be used, and may be contact-based or non-contact based, such as a tachometer, a speed probe, a Hall effect sensor, an optical sensor, a magnetic sensor, a proximity sensor, an inductive sensor, and the like. In some embodiments, the methods and systems for detecting a shaft event make use of existing sensors and/or sensor readings already provided in most engines, such as engine 10, in order to obtain the speed of the high pressure spool.

The x-axis of the graph 200 represents a load transfer through a shaft of a second spool, such as the low pressure shaft 20 of the low pressure spool. The load transfer is the measurable change of load borne by the low pressure shaft 20 during acceleration and deceleration (both longitudinal and lateral) of the low pressure spool. One or more moments are generated during acceleration/deceleration that cause variation in the load distributed on the low pressure shaft 20. It is this variation that is measured as the load transfer. The load transfer may be measured using various parameters, such as the torque of low pressure turbine 26, the horsepower of low pressure shaft 20, and the twist angle of low pressure shaft 20. Any of these parameters may be measured using a torque sensor, which may be provided in a reduction gearbox (RGB) 32 in engine 10, or at any other location proximal to the low pressure shaft 20.

In some embodiments, the load transfer is measured using a deflection or distance measurement, for example using reference points placed on a torque tube or a reference tube. When a load is transmitted through the low pressure shaft 20, the distance between the reference points will increase or decrease proportionally to the load transmitted through the shaft. In other embodiments, the load transfer is measured using a load or force from a load cell, or using a stress or strain from a strain gauge. The strain gauge may be placed on the low pressure shaft 20. In other embodiments, the strain gauge voltage is used as a measurement that is proportional to the load transmitted through the shaft 20. Any other parameter that is indicative of load transfer through the shaft 20 may also be used.

Graph 200 is separated into a normal engine operation zone 202 and a shaft event zone 204. The zones 202, 204 are separated by a detection threshold 206. Under normal operation, measured values for the high pressure spool speed and the load transfer fall in the normal operation zone 202, which is to the right of the detection threshold 206 in the particular example shown in graph 200. If the x and y axes of the graph 200 were inverted, then the normal operation zone 202 would be above the detection threshold 206 and the shaft event zone 204 would be below the detection threshold. In the event of a shaft shear or other shaft failure, high pressure spool speed remains high but the measured load transfer quickly drops toward zero, thus moving from the normal engine operation zone 202 past the detection threshold 206 and into the shaft event zone 204. Therefore, when the measured load transfer and corresponding high pressure spool speed is mapped into the shaft event zone 204, a shaft event is detected.

Figure 2B:
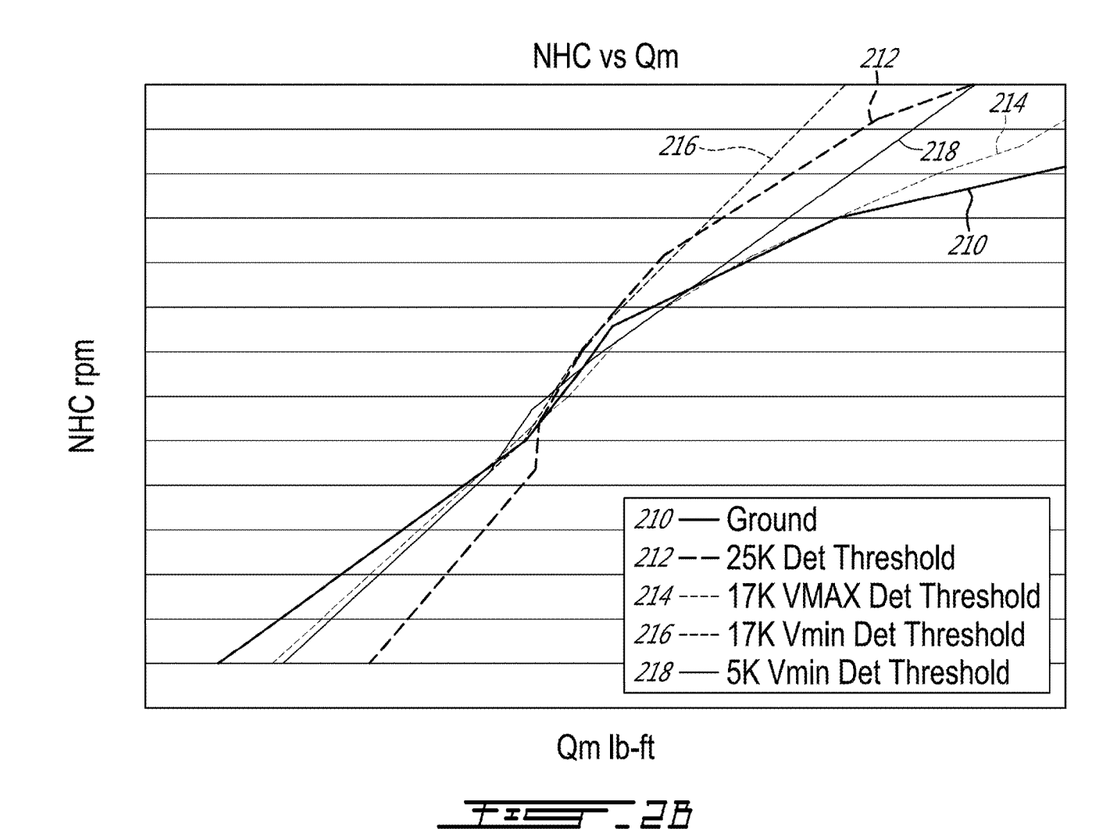
FIG. 2B is a graph of example detection thresholds.

The detection threshold 206 may be determined through testing and/or via computer simulations. Example detection thresholds are illustrated in FIG. 2B, using torque (Q) as the parameter indicative of load transfer. Detection thresholds may be determined using flight test data for various conditions and manoeuvres, such as acceleration, deceleration, landing, reverse thrust, handling manoeuvres, flameouts, windmilling, and the like. Data may also be gathered for different flight conditions, such as, but not limited to, at ground level (210), 5K Vmin (218), 17K Vmin (216), 17k Vmax (214), and 25K Vmax (212), and different detection thresholds may be established for each flight condition. The threshold values illustrated in FIG. 2B are stacked for various flight parameters, including but not limited to MACH Number, Calibrated Airspeed (CAS) and ambient temperature.

In some embodiments, the detection threshold 206 is engine model specific or engine condition specific. For example, detection threshold 206 may vary as a function of certain engine characteristics, such as ambient pressure. The detection threshold may therefore vary for a same first spool speed for different ambient pressures, such as 5.5 psia, 7.8 psia, 12.34 psia, and 14.7 psia. Other ambient pressure values are also applicable. In addition, engine acceleration/deceleration capabilities may also have an impact on the detection threshold. In some embodiments, the detection threshold 206 varies as a function of flight conditions, such as airspeed and/or atmospheric conditions.

In practice, the detection threshold may be stored in tabular form, as a function of a variable parameter such as ambient pressure, as illustrated in Table 1. The ambient pressure (Pamb) range can vary between different aircraft depending on the specific altitude flight envelope of the aircraft.

TABLE 1

| High Pressure Spool Speed | Ambient Pressure | | | |
|---|---|---|---|---|
| (rpm) | 5.5 psia | 7.8 psia | 12.34 psia | 14.7 psia |
| 18000 | 6500 | 6525 | 6550 | 6575 |
| 20000 | 1800 | 1825 | 1850 | 1875 |
| 22000 | 600 | 625 | 650 | 675 |
| 24000 | 200 | 225 | 250 | 275 |
| 26000 | 50 | 55 | 60 | 65 |

The leftmost column indicates a high pressure (HP) spool speed which can vary depending on the engine's operation range. In this example, the speed is measured in rotation per minute (rpm). The other columns represent corresponding torque values (in lb-ft) that are found along the detection threshold 206 of the graph 200. Any new measured value for torque may be compared to the detection threshold value for torque from Table 1, for a given HP spool speed, to determine whether it falls in the shaft event zone 204 or the normal engine operation zone 202. Newly measured torque values that are less than the torque values in Table 1 are indicative of a shaft event.

In some embodiments, the detection thresholds are modified or adjusted to prevent false detection due to various non-shaft events, such as ice/hail stone ingestion, ice sheet ingestion, bird ingestion, fuel flow runaway event, feathering/unfeathering of the propeller, flameout, surge events, and the like.

In some embodiments, negative load transfer values are not used for detecting the shaft event. For example, detection logic may be shut off below a certain power level of the engine to ensure only positive values are measured and/or only turned on above a certain power level. Alternatively, a different detection threshold may be used for negative load transfer values.

Figure 3:
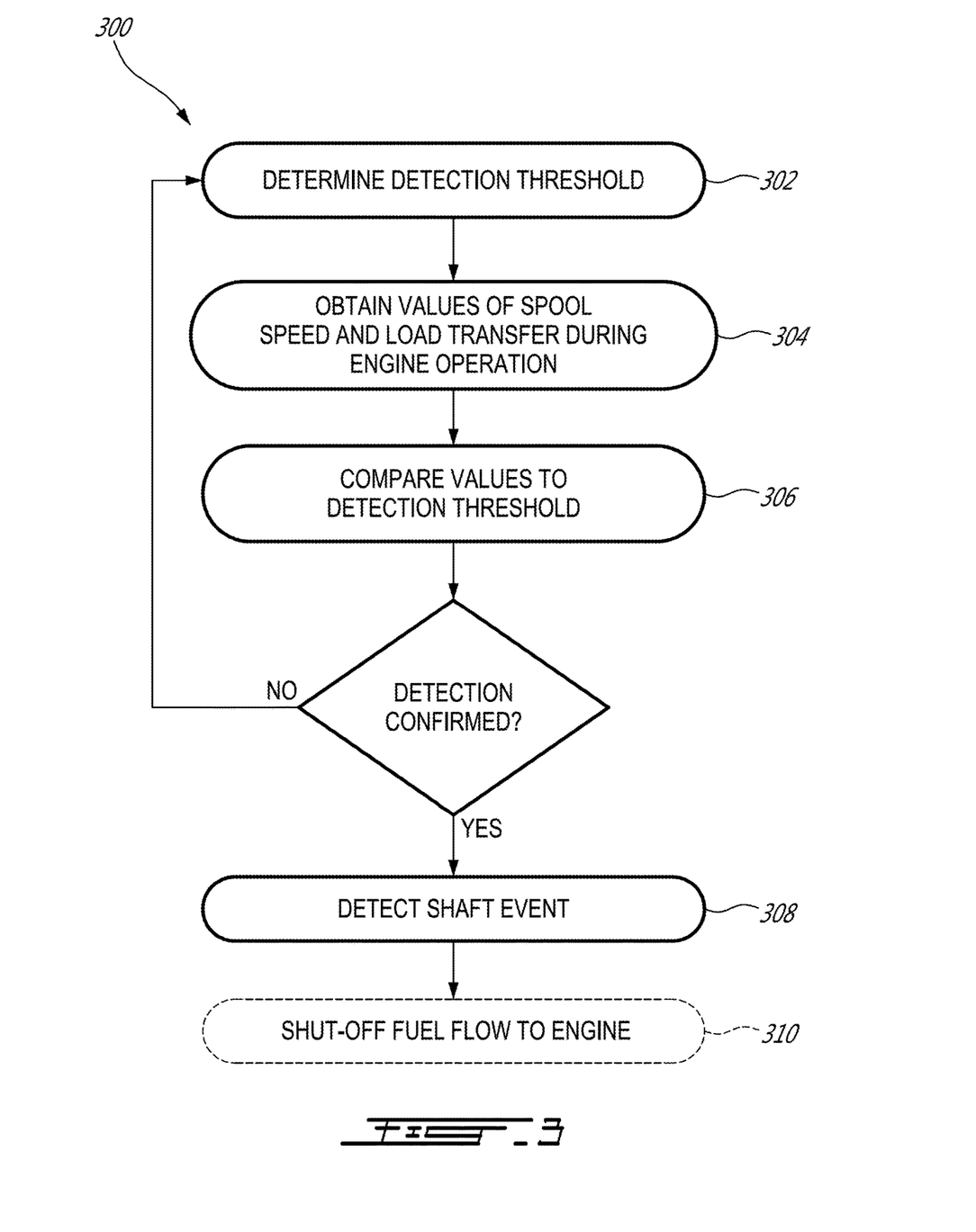
FIG. 3 is a flowchart of a shaft event detection method, in accordance with an embodiment.

Referring to FIG. 3, there is illustrated a flowchart of an example method 300 for detecting a shaft event. At step 302, the detection threshold is determined. This may include setting or generating the detection threshold as a function of various input parameters, such as engine characteristics, flight conditions, engine operating conditions, and other data. In some embodiments, determining the detection threshold comprises storing the detection threshold in memory. In some embodiments, determining the detection threshold comprises receiving pairs of operation values for the spool speed of the first spool and the load transfer of the second spool throughout a flight envelope that fall into either one of the two detection zones, namely the normal engine operation zone and the shaft event zone. The received pairs of operation values may be stored in memory. In some embodiments, determining the detection threshold comprises retrieving the sets of operation values from a local or remote memory.

At step 304, operation values for the spool speed from the first spool and the load transfer through a shaft of a second spool are obtained during engine operation. This may include performing the measurements for the spool speed and/or the load transfer. Alternatively, this may include simply receiving the measurements for the spool speed and/or the load transfer. At step 306, the operation values for the spool speed and the load transfer are compared to the detection threshold. If the operation values are beyond the detection threshold, a shaft event is detected, as per step 308. If the operation values are not beyond the detection threshold, the method returns to step 302 determining a detection threshold, followed by step 304 of obtaining the operation values, and followed by step 306 of comparing the operation values to the detection threshold. In some embodiments, the method 300 returns to step 304 instead of returning to step 302.

In some embodiments, a shaft event is detected only after a predetermined number of iterations where the operation values move past the detection threshold into the shaft event zone. For example, the number of required iterations may be set to 2, 5, 10, or any other value used to satisfy a criteria for confirming the measurement. In such embodiments, a counter may be set to an initial value and incremented until the counter value is equal to or greater than the number of required iterations. This may be done, for example, when confirming detection after having compared the operation values to the detection threshold, as per step 306.

In some embodiments, step 308 of detecting the shaft event comprises transmitting a signal indicative of the shaft event. The signal may be used to shut-off the fuel flow to the engine, as per step 310. Alternatively, or in combination therewith, detecting the shaft event comprises triggering a warning, such as a light or a text message in an aircraft cockpit or elsewhere, indicative of the shaft event. Other embodiments for actions resulting from the detected shaft event may also be used.

Figure 4:
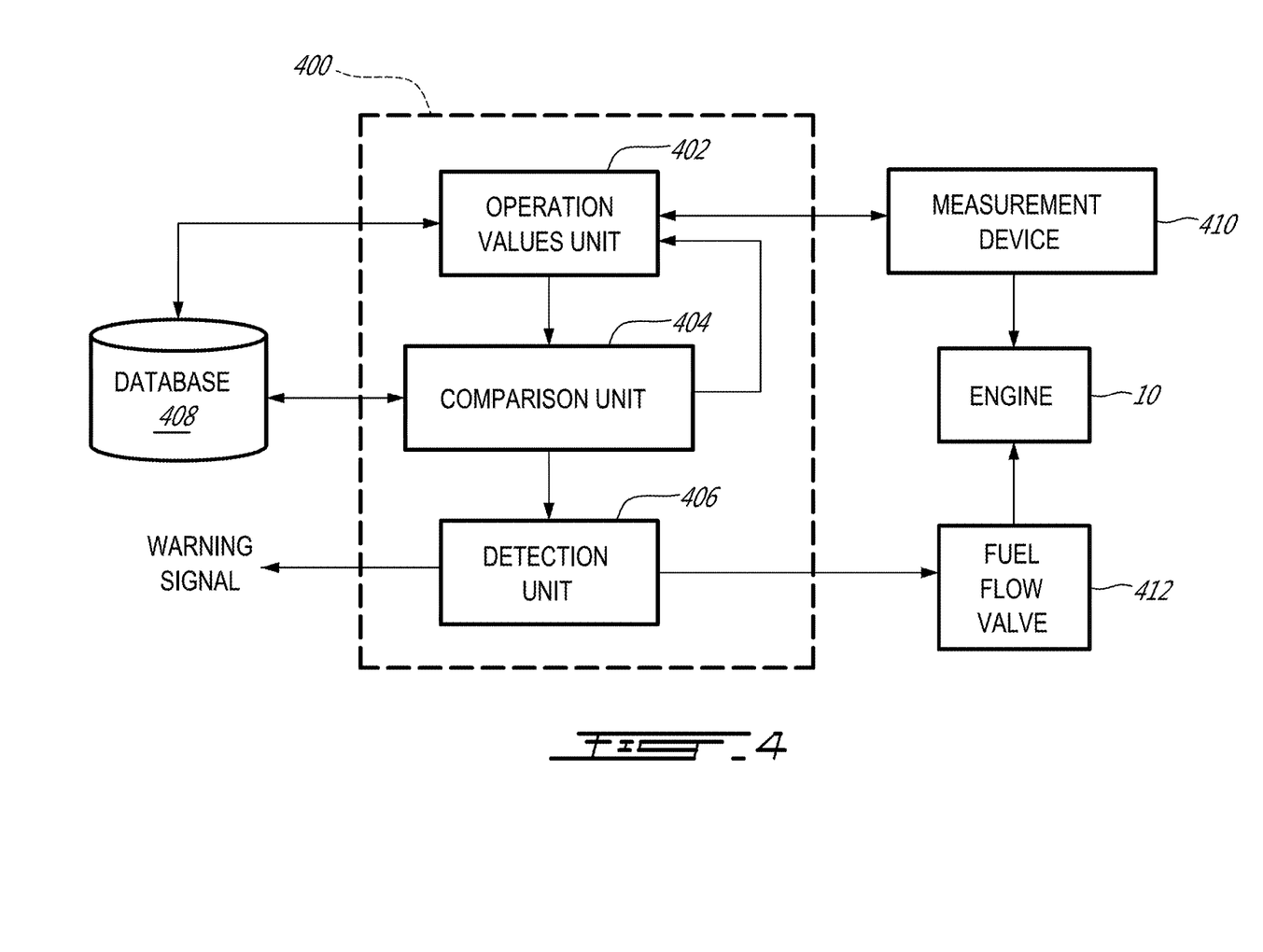
FIG. 4 is an example embodiment of a shaft event detection system.

FIG. 4 illustrates an exemplary embodiment of a detection system 400 for detecting the shaft event. The system 400 illustratively comprises an operation values unit 402, a comparison unit 404, and a detection unit 406. The operation values unit may be configured to obtain the operation values for spool speed of the first spool and load transfer through a shaft of the second spool, by receiving the operation values or retrieving the operation values from a local or remote storage medium, such as database 408. In some embodiments, the operation values unit 402 is operatively coupled to one or more measurement device 410 such as a sensor or a probe, which is itself coupled to the engine 10, and receives measurements directly therefrom. In some embodiments, the operation values unit 402 is configured for controlling the measurement device 410 so as to cause the measurements to be acquired. Various data processing operations may be performed on the received measurements by the operation values unit 402, such as averaging, filtering, fault detection, and the like.

Once received, the operation values are provided to the comparison unit 404. The operation values are compared to the detection threshold. The detection threshold may be retrieved or received from a local or remote storage medium, such as database 408. In some embodiments, the comparison unit 404 or the operation values unit 402 may be configured to receive various parameters and to generate the detection threshold for comparison with the operation values as a function of the received parameters. The operation values unit 402 or the comparison unit 404 may be configured to retrieve engine specific parameters, for example from database 408, in order to generate the detection threshold using detection threshold specifications. The result of the comparison is transmitted to the detection unit 406, which may be configured to transmit a fuel shutoff command to one or more engine fuel flow valve 412. The detection unit 406 may also be configured to transmit a warning signal, for example to the aircraft cockpit or externally to the aircraft, in case of a shaft event.

In some embodiment, there may be a feedback loop between the comparison unit 404 the operation values unit 402 in order to increment a counter, and the shaft event is only detected when the counter reaches a predetermined number.

The detection system 400 may be implemented in various manners, such as in software on a processor, on a programmable chip, on an Application Specific Integrated Chip (ASIC), or as a hardware circuit. In some embodiments, the detection system 400 is implemented in hardware on a dedicated circuit board located inside an Electronic Engine Controller (EEC) or an Engine Control Unit (ECU). The EEC or ECU may be provided as part of a Full Authority Digital Engine Control (FADEC) of an aircraft. In some cases, a processor may be used to communicate information to the circuit, such as spool speed and/or load transfer measurements. In other embodiments, the detection system 400 is implemented in a digital processor. In some embodiments, the FADEC performs the shutdown of the fuel once a shaft shear event has been detected.

Figure 5:
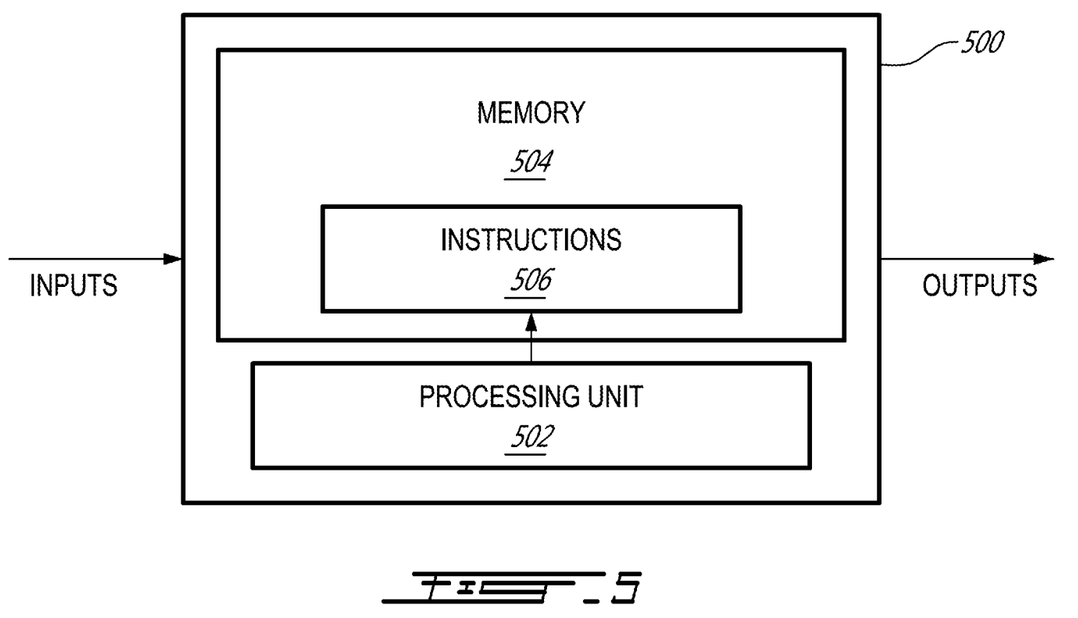
FIG. 5 is an example computing device for implementing the shaft event detection system of FIG. 4.

An example embodiment of the system 400 is illustrated in FIG. 5. A computing device 500 may comprise, amongst other things, a processing unit 502 and a memory 504 which has stored therein computer-executable instructions 506. The processing unit 502 may comprise any suitable devices configured to cause a series of steps to be performed so as to implement the method 300 such that instructions 506, when executed by the computing device 500 or other programmable apparatus, may cause the functions/acts/steps specified in the methods described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable machine-readable storage medium. The memory 504 may comprise non-transitory computer readable storage medium such as, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device 500, such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions executable by processing unit.

In some embodiments, the computing device 500 sends one or more control signals directly to fuel valves for shutting off the engine fuel flow. In other embodiments, the control signals are sent to an intermediary unit (not shown), which translates the control signals sent by the computing device 500 into signals to be sent to the fuel valves.

The methods and systems for detecting the shaft event described herein may be implemented in a high level procedural or object oriented programming or scripting language, or a combination thereof, to communicate with or assist in the operation of a computer system, for example computing device 500. Alternatively, the methods and systems for detecting the shaft event may be implemented in assembly or machine language. The language may be a compiled or interpreted language. Program code for implementing the methods and systems for detecting the shaft event may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting the shaft event may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems for detecting the shaft event may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting a shaft event in a gas turbine engine, the method comprising:

determining a detection threshold as a set of threshold values for a spool speed of a first spool of the engine and a load transfer through a shaft of a second spool of the engine different from the first spool, the set of threshold values varying throughout a flight envelope, the detection threshold defining, for each spool speed value, at least one load transfer value beyond which a shaft event is detected;

obtaining operation values of the spool speed and the load transfer during operation of the engine comprising measuring the load transfer with at least one of a torque sensor and a strain gauge;

comparing the operation values to the detection threshold; and detecting the shaft event when the operation values are beyond the detection threshold; and turning off a fuel flow to the engine upon detecting the shaft event.

2. The method of claim 1, wherein the first spool is a high pressure spool and the second spool is a low pressure spool, and wherein obtaining the operation values comprises measuring the load transfer through a low pressure shaft.

3. The method of claim 1, wherein the first spool is one of a high pressure spool and a low pressure spool, and the second spool is one of a low pressure turbine spool and a power turbine spool, and wherein obtaining the operation values comprises measuring the load transfer through a power turbine shaft.

4. The method of claim 1, wherein the detection threshold is engine specific and varies as a function of engine characteristics.

5. The method of claim 1, wherein the detection threshold varies as a function of flight conditions.

6. The method of claim 1, wherein the detection threshold comprises a plurality of load transfer values for each spool speed value, each one of the plurality of load transfer values being associated with a given engine operating parameter.

7. A system for detecting a shaft event in a gas turbine engine, the system comprising:
 a processing unit; and
 a non-transitory memory communicatively coupled to the processing unit and comprising computer-readable program instructions executable by the processing unit for:
  determining a detection threshold as a set of threshold values for a spool speed of a first spool of the engine and a load transfer through a shaft of a second spool of the engine different from the first spool, the set of threshold values varying throughout a flight envelope, the detection threshold defining, for each spool speed value, at least one load transfer value beyond which a shaft event is detected;
  obtaining operation values of the spool speed and the load transfer during operation of the engine comprising obtaining measurements of the load transfer from at least one of a torque sensor and a strain gauge;
  comparing the operation values to the detection threshold; and
  detecting the shaft event when the operation values are beyond the detection threshold; and
  causing a fuel flow to the engine to be turned off upon detecting the shaft event.

8. The system of claim 7, wherein the first spool is a high pressure spool and the second spool is a low pressure spool, and wherein obtaining the operation values comprises measuring the load transfer through a low pressure shaft.

9. The system of claim 7, wherein the first spool is one of a high pressure spool and a low pressure spool, and the second spool is one of a low pressure turbine spool and a power turbine spool, and wherein obtaining the operation values comprises measuring the load transfer through a power turbine shaft.

10. The system of claim 7, wherein the detection threshold is engine-specific and varies as a function of engine characteristics.

11. The system of claim 7, wherein the detection threshold varies as a function of flight conditions.

12. The system of claim 1, wherein the detection threshold comprises a plurality of load transfer values for each spool speed value, each one of the plurality of load transfer values being associated with a given engine operating parameter.

13. A non-transitory computer readable medium having stored thereon program code executable by a processor for detecting a shaft event in a gas turbine engine, the program code comprising instructions for:
 determining a detection threshold as a set of threshold values for a spool speed of a first spool of the engine and a load transfer through a shaft of a second spool of the engine different from the first spool, the set of threshold values varying throughout a flight envelope, the detection threshold defining, for each spool speed value, at least one load transfer value beyond which a shaft event is detected;
 obtaining operation values of the spool speed and the load transfer during operation of the engine comprising obtaining measurements of the load transfer from at least one of a torque sensor and a strain gauge;
 comparing the operation values to the detection threshold; and
 detecting the shaft event when the operation values are beyond the detection threshold; and
 causing a fuel flow to the engine to be turned off upon detecting the shaft event.

* * * * *